(12) United States Patent
Sharma et al.

(10) Patent No.: US 9,335,213 B2
(45) Date of Patent: May 10, 2016

(54) SPECTRAL-DOMAIN INTERFEROMETRIC METHOD AND SYSTEM FOR CHARACTERIZING TERAHERTZ RADIATION

(71) Applicant: INSTITUT NATIONAL DE LA RECHERCHE SCIENTIFIQUE, Quebec (CA)

(72) Inventors: Gargi Sharma, Brampton (CA); Kanwarpal Singh, Brampton (CA); Roberto Morandotti, Montreal (CA); Tsuneyuki Ozaki, Brossard (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 0 days.

(21) Appl. No.: 14/417,968

(22) PCT Filed: Aug. 1, 2013

(86) PCT No.: PCT/CA2013/050596
§ 371 (c)(1),
(2) Date: Jan. 28, 2015

(87) PCT Pub. No.: WO2014/019091
PCT Pub. Date: Feb. 6, 2014

(65) Prior Publication Data
US 2015/0192467 A1 Jul. 9, 2015

Related U.S. Application Data

(60) Provisional application No. 61/678,156, filed on Aug. 1, 2012.

(51) Int. Cl.
*G01J 3/45* (2006.01)
*G01J 11/00* (2006.01)
(Continued)

(52) U.S. Cl.
CPC .. *G01J 3/45* (2013.01); *G01J 3/108* (2013.01); *G01J 3/453* (2013.01); *G01J 11/00* (2013.01)

(58) Field of Classification Search
CPC .................. G01J 3/42; G01J 3/10; G01J 3/45
See application file for complete search history.

(56) References Cited

U.S. PATENT DOCUMENTS

| 6,111,416 A | 8/2000 | Zhang et al. |
| 6,479,822 B1 | 11/2002 | Nelson et al. |
| 2009/0206263 A1* | 8/2009 | Rahman ..................... 250/341.1 |

(Continued)

OTHER PUBLICATIONS

Bajraszewiski, et al., "Improved Spectral Optical Coherence Tomography using Optical Frequency Comb", Optics Express, Mar. 17, 2008, 4163-4176, vol. 16 No. 6, OSA, US.

(Continued)

*Primary Examiner* — Marcus Taningco
(74) *Attorney, Agent, or Firm* — Goudreau Gage Dubuc; Gwendoline Bruneau

(57) ABSTRACT

A method and system based on spectral domain interferometry for detecting intense THz electric field, allowing the use of thick crystal for spectroscopic purposes, in order to makes long temporal scans for increased spectral resolutions, and overcoming the limitation of over-rotation for presently available high power THz sources. Using this method and system the phase difference of approximately $8898\pi$ can be measured, which is 18000 times higher than the phase difference measured by electro-optic sampling ($\pi/2$).

8 Claims, 3 Drawing Sheets

(51) Int. Cl.
*G01J 3/10* (2006.01)
*G01J 3/453* (2006.01)

(56) References Cited

U.S. PATENT DOCUMENTS

2011/0267599 A1 11/2011 Hurley
2011/0272584 A1 11/2011 Zhang et al.

OTHER PUBLICATIONS

Ferguson et al., "Materials for Terahertz Science and Technology", Nature Materials, 2000.
Fletcher, J.R., "Distortion and Uncertainty in Chirped Pulse THz Spectrometers", Optic Express, Dec. 2, 2002, 1425-1430, vol. 10 No. 24, OSA, US.
Jamison et al., "High-temporal-resolution Single-shot Characterization of Terahertz Pulses", Optic Letters, Sep. 15, 2003, 1710-1712, vol. 28 No. 18, Optical Society of America, US.
Jepsen et al., "Detection of THz Pulses by Phase Retardation in Litium Tantalate", Physical Review E., Apr. 1996, 3052-3054, vol. 53 No. 4, The American Physical Society, US.
Jiang et al., "Single-shot Spatiotemporal Terahertz Field Imaging", Optic Letters, Jul. 15, 1998, 1114-1116, vol. 23 No. 14, Optical Society of America, US.
Kawada et al., "Real Time Measurement of Temporal Waveforms of Terahertz Pulse Using a Probe Pulse with a Tilted Pulse Front", Optic Letters, Jan. 15, 2008, 180-182, vol. 33 No. 2, Optical Society of America, US.
Kim et al., "Single-shot Terahertz Pulse Characterization Via Two-dimensional Electro-optic Imaging with Dual Echelons", Optic Letters, Jul. 15, 2007, 1968-1970, vol. 32 No. 14, Optical Society of America, US.
Kono et al., "Detection of Up to 20 THz with a Low-temperature-grown GaAs Photoconductive Antenna Gated with 15 fs Light Pulses", Applied Physics Letters, Dec. 18, 2000, 4104-4106, vol. 77 No. 25, American Institute of Physics, US.
Lu et al., "Balanced Terahertz Wave Air-biased-coherent-detection", Applied Physics Letters, Apr. 14, 2011, 151111-1 to 151111-3, 98, American Institute of Physics, US.
Markelz et al., "Pulsed Terahertz Spectroscopy of DNA, Bovine Serum Albumin and Collagen between 0.1 and 2.0 THz", Chem. Phys. Lett., 1-11.
Wu et al., "Freespace electrooptic sampling of Terahertz beams", Applied Physics Letters, Oct. 3, 1995, 3523-3525, 67 (24), American Institute of Physics, US.
Zhang et al., "High-dynamic-range quantitative phase imaging with spectral domain phase microscopy", Optic Letters, Nov. 1, 2009, 3442-3444, vol. 34 No. 21, Optical Society of America, US.
International Search Report, Written Opinion, International Application No. PCT/CA 2013/050596.

* cited by examiner

SPECTRAL-DOMAIN INTERFEROMETRIC METHOD AND SYSTEM FOR CHARACTERIZING TERAHERTZ RADIATION

CROSS-REFERENCE TO RELATED APPLICATIONS

This application is a National Entry Application of PCT application no PCT/CA2013050596 filed on Aug. 1, 2013 and published in English under PCT Article 21(2), which itself claims benefit of U.S. provisional application Ser. No. 61/678,156, filed on Aug. 1, 2012. All documents above are incorporated herein in their entirety by reference.

FIELD OF THE INVENTION

The present invention relates to terahertz radiation. More specifically, the present invention is concerned with a method and a system for characterizing terahertz radiation.

BACKGROUND OF THE INVENTION

Terahertz (THz) radiation, with frequencies ranging from 0.1 to 10 THz, bridges the gap between radio frequencies and the infrared. This part of the electromagnetic spectrum remains the least explored, mainly due to technical difficulties involved in making efficient and compact THz sources and detectors. The lack of suitable technologies led to the THz band being called the "THz gap". This technological gap is rapidly diminishing with tremendous advances in optical technologies in the last two decades.

THz sources and detectors have many important potential applications in the areas of spectroscopy, detection, and security [1-3]. For example, the low energy photons of the THz radiation can be safely used on humans for security purposes at airports, to detect weapons and explosives. THz radiation can also be used to study the vibrational modes of several biological and chemical molecules, since these modes have energies corresponding to THz photon energies. One example is the twisting and deformation of the double-helix structure in DNA. THz radiation is also suitable to study carrier transport and relaxation dynamics in condensed matter, such as bulk semiconductors, semiconductor quantum wells, carbon nanotubes, semiconductor quantum wells, and single-monolayer graphene sheets.

Various methods such as photoconductive antenna [4], electro-optic (EO) sampling [5], and air-biased-coherent-detection (ABCD) [6] have been proposed and demonstrated in order to measure the spatial and temporal profile of the THz electric field.

Among these, the electro-optic (EO) sampling method is widely used for THz time-domain spectroscopy (THz-TDS), due to the relatively straightforward physics involved and its wide bandwidth [7].

In the electro-optic (EO) sampling method, a linearly polarized femtosecond laser pulse co-propagates with a few picosecond THz pulse in an electro-optic (EO) crystal. The THz electric field induces birefringence in the crystal, which changes the polarization of the linearly co-propagating laser pulse. The change in the phase between the two polarization components of the probe beam, which is proportional to the THz electric field, is measured by using two cross polarizers before and after the detector crystal, and appears as a modulation in the intensity of the probe beam. The complete THz waveform is then reconstructed by scanning the probe pulse over the entire THz pulse.

Several improvements over the EO sampling method have been proposed in the past to improve the detection of THz radiation. Such methods include a chirped-pulse or spectral-encoding method [8], a cross-correlation method [9], a two dimensional THz pulse characterization method with dual echelons [10], and a tilted wavefront detection method using prism [11].

Since a major advantage of THz radiation is the possibility of coherent detection, in which information on both the electric field and phase can be measured simultaneously, THz radiation is a very important tool for spectroscopy and imaging applications. In order to make use of advantageous features, such as wide bandwidth, of THz sources, a detection technique with (i) high spectral resolution and (ii) high sensitivity is needed.

The spectral resolution ($\Delta\mu$) obtained from a temporal scan of THz pulse depends on the length (T) of the scan ($\Delta\mu=1/T$). Therefore, to realize higher spectral resolution in THz-TDS, one needs to take waveform scans over longer time. In order to allow longer time scans, one needs to use thicker detection crystals. This is because part of the femtosecond probe beam is reflected from the two faces of the crystal. If a thin crystal is used, these internal reflections interfere with the main detected THz signal, which induces beating in the spectrum, thus distorting the measurement.

High sensitivity is achieved with the use of a lock-in amplifier. In order to use the lock-in amplifier, first the THz signal is chopped at f/2 frequency where f is the repetition rate of the laser and then this signal is fed to the lock-in amplifier, which filters the THz signal, increasing its sensitivity.

All methods up to now, which are based on EO sampling, use two cross polarizers, i.e. a first one placed before and a second one placed after, the detector crystal, to measure the polarization rotation of the probe beam, from which THz electric field is evaluated. However, when the polarization of the probe beam rotates more than 90°, a reversal in the intensity modulation of the detection beam occurs, thus not allowing the correct measurement of the THz electric field and waveform [12]. This situation is referred to as "over-rotation". The birefringence introduced in the EO crystal is proportional to the THz electric field and the thickness of the crystal. Thus the issue of over-rotation increases with the increasing thickness of the crystal. One could in principle use thinner crystals to avoid over-rotation, but the use of thin crystal causes interference effects discussed above. With the recent advances in high power THz generation methods, over-rotation is becoming a major issue for THz-TDS.

On the other hand, thinner crystals result in reduced THz signal and thus poor signal-to-noise ratio (SNR) of the measurement, due to a decrease in the interaction length. In a previously proposed ABCD method [6], although not limited by the problem of over-rotation, the use of a high voltage supply and lock-in amplifier makes it more complicated when compared to the EO sampling method.

There is still a need for a THz electric field measurement method and system.

SUMMARY OF THE INVENTION

More specifically, in accordance with the present invention, there is provided a spectral domain interferometry system for characterizing terahertz radiation, comprising a glass plate generating, from a probe beam, two pulses separated by an optical delay; a terahertz source, generating a terahertz beam from a pump beam; an off-axis mirror; a first and a second cylindrical lenses; a detector crystal; and a spectrometer; wherein the terahertz beam is focused into the detector crystal by the off-axis mirror, the two pulses propagate through the first cylindrical lens and a hole in the off-axis mirror, are line focused onto the detector crystal at the same position as the THz beam and propagate through the second cylindrical lens to the spectrometer, the spectrometer measuring changes in interference between the two pulses generated by the glass plate due to birefringence induced by the terahertz electric field.

There is further provided a method for characterizing terahertz radiation comprising using spectral domain interferometry to measure a change in the phase delay between a probe beam and a reference beam introduced by an electro-optic crystal due to birefringence induced by a terahertz electric field Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In conventional spectral domain interferometry (SDI), a broadband light source of bandwidth $\Delta\lambda$ centered around $\lambda_0$ is used to illuminate a reference surface and a sample surface in a Michelson interferometer scheme. The reflected signals from the reference and the sample surface, with intensities $I_R$ and $I_S$ respectively, are dispersed over a charged-coupled device (CCD) camera using a grating, to yield an interference signal that can be represented by:

$$I(k) = I_R(k) + I_S(k) + 2\sqrt{I_R(k)I_S(k)} \cos[\phi_0 + 2kL] \quad (1)$$

where $k=2\pi/\lambda$ is the wave vector, $\phi_0$ is a phase constant and L is the optical path difference (OPD) between the reference signal and the sample signal.

The instantaneous phase difference between the reference surface and the sample surface is determined using the following relation:

$$\phi = \arctan\left(\frac{\text{Im}(\tilde{I}(L))}{\text{Re}(\tilde{I}(L))}\right) \quad (2)$$

where $\tilde{I}(L)$ is the Fourier transform of relation (1) above.

Thus, change in the optical path difference (OPD) over the time can be tracked[13] by monitoring the phase change given by relation (2). The phase measured with relation (2) is discontinuous due to the presence of arctangent but one can circumvent this issue by using conventional phase unwrapping methods[14].

Figure 1:
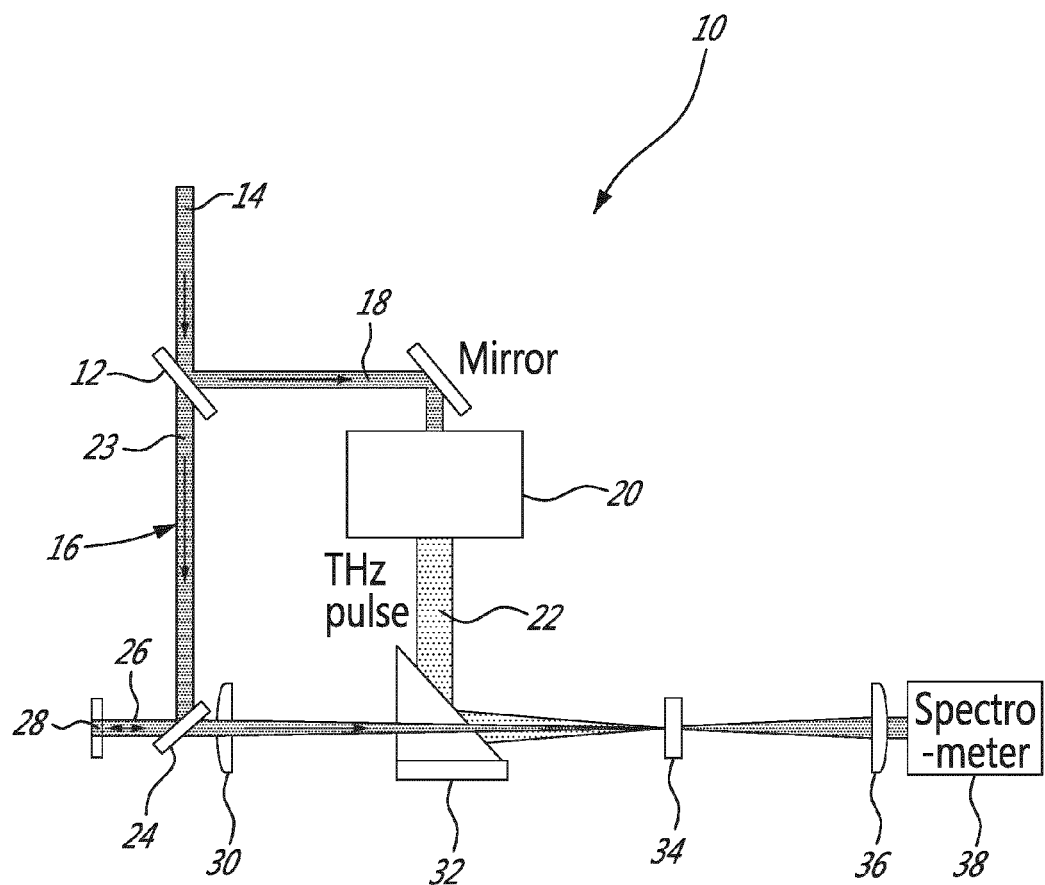
FIG. 1 shows a system according to an embodiment of an aspect of the present invention.

A system 10 according to an embodiment of an aspect of the present invention is shown in FIG. 1.

The input laser from a laser 14 is split into two beams 16, 18 by a first beam splitter 12. The pump beam 18 is used to generate a THz signal 22 using a tilted pulse front method in a THz source 20 such as a $LiNbO_3$ crystal for example. This THz source generates 0.3 µJ THz pulses, with bandwidth extending from 0.1 THz to 3 THz.

The probe beam 16 is used for detecting the THz electric field. A second beam splitter 24 splits the probe beam 16 into two equal parts. A reflected part 26 of the beam goes to a glass plate 28. The two surfaces of the glass plate 28 reflect about 4% of this incident beam 26. Half of the probe beam 16 that is reflected from the glass plate 28 is transmitted through the second beam splitter 24. The reflected signal from the glass plate consists of two pulses, i.e. a first pulse that is reflected from the front surface of the glass plate 28 (the right surface of the glass plate 28 in FIG. 1), referred to hereinafter as the front pulse, and a second pulse reflected from the back surface of the glass plate 28 (the left surface of the glass plate 28 in FIG. 1), referred to hereinafter as the back pulse. The delay between the two pulses is set by the thickness of the glass plate 28, which is selected so that the delay is longer than the duration of the THz pulse, thereby ensuring that the front pulse is not affected by the THz pulse. In case of a glass plate 28 having a refractive index of 1.5 and a thickness of 0.3 mm, the front pulse and the back pulse are separated by 3 ps.

The THz beam 22 is focused into a 0.5 mm thick detector crystal 34 such as a ZnTe crystal 34 by an off-axis mirror 32. The front pulse and the back pulse propagate through a first cylindrical lens 30 and a hole in the off-axis mirror 32, and are line focused onto the detector crystal 34 at the same position as the THz beam 22. The front pulse and the THz pulse are overlapped in space and time in the detector crystal 34 while the back pulse and the THz pulse are overlapped in space only in the detector crystal 34.

A second cylindrical lens 36 is used to collimate the probe beam, which is then sent to a spectrometer 38, where the front pulse and the back pulse interfere. The first and second cylindrical lenses 30, 36 allow space resolution detection of the THz beam. The interference between the front pulse and the back pulse is observed as modulation in the spectrum of the probe pulses. A Fourier transform of the probe pulses provide information on the relative phase between the front and back pulses, which in turn provides information on the THz electric field to be measured.

The spectrometer 38 consists of a grating with 600 groves/mm, a cylindrical lens with focal length of f=100 mm and a 2D CCD (Charge-Coupled Device) camera of 760×1024 pixels. At the spectrometer 38, interference fringes are caused by the interference between the front and back pulses. Since the different spectral components of the beam are separated after the diffraction grating of the spectrometer 38, the various spectral components of the probe pulse are not mode locked any more. This is why one can measure the interference pattern over the depth range of the SDI technique, determined by the spectrometer 38 used. For a Gaussian profiled spectrum, the depth range can be written as follows:

$$d_{max} = \frac{2\ln 2}{\pi} \frac{N}{2} \frac{\lambda_0^2}{\Delta\lambda} \quad (3)$$

Using the values of the parameters for the system illustrated in FIG. 1, i.e. central wavelength $\lambda_0$=790 nm, bandwidth $\Delta\lambda$=40 nm and number of pixels of the CCD camera of the spectrometer 38 N=1024 in relation (3), the theoretical depth range of the system is calculated to be 3.51 mm. This is the reason why the interference between the front and back probe pulses separated by the thickness of the glass plate 28 (3 ps) can easily be measured with SDI. Considering a change of $2\pi$ in the phase for one wavelength change in OPD, with the depth range of 3.51 mm, an OPD equal to $8898\pi$ at $\lambda_0=790$ nm can thus be measured. In contrast, in EO sampling one can measure a maximum phase change of $\pi/2$, which is approximately 18,000 times smaller than the OPD measurable with the present method.

To measure the complete THz pulse, an optical delay line is used to vary the time between the THz pulse and the optical pulse. The THz pulse is temporally matched with the optical back probe pulse. The delay between the front pulse and the back pulse is large enough (3 ps) so that the front pulse can pass through the detector crystal 34 without seeing the THz electric field. The presence of the THz electric field changes the refractive index of the detector crystal 34 via the Pockel effect, which affects the back pulse, which is temporally matched with the THz pulse, but not the front pulse, thus introducing a phase difference between the two optical probe pulses. This phase change between the two optical probe pulses is proportional to the THz electric field. Therefore, the THz pulse shape may be reconstructed by changing the delay stage. In the present SDI method, the change in the phase introduced by the change in refractive index of the detector crystal 34 is measured, from which the THz electric field can be measured up to the depth range of the spectral domain method.

In order to reconstruct the THz signal, the data from the camera are numerically treated, involving some intermediate steps, as follows. First, the data from the camera of the spectrometer 38 which were acquired in the wavelength space are rescaled in the wave vector (k)-space. These data were then Fourier transformed to obtain the frequency corresponding to the OPD between the two signals reflected from the glass plate 28. The phase between the two pulses reflected from the glass plate 28 are determined using relation (2) above. This phase is tracked over time by changing the delay between the THz signal and the probe signal. The phase waveform gives the waveform of the THz signal.

Figure 2:
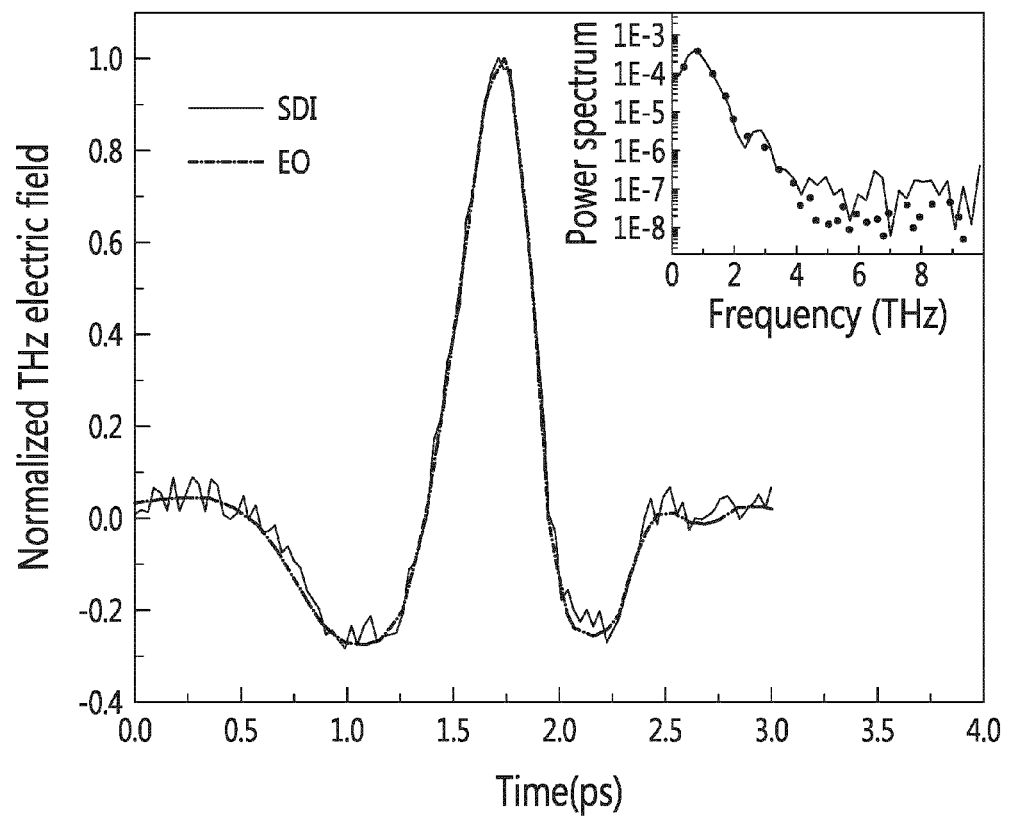
FIG. 2 shows THz electric field measurement with spectral domain interferometry (SDI) (solid line) and EO sampling (dashed line), the inset showing the corresponding spectrum of the THz field taken with the two methods respectively.

The THz electric field measured using the present system and method is shown in FIG. 2. To make a comparison, the EO sampling was done as well and is shown in dashed lines in FIG. 2. The corresponding spectrum is shown as an inset of FIG. 2.

The signal to noise of the SDI appears to be lower than the EO sampling, but it can be improved using a low readout noise camera of the spectrometer 38. In the SDI detection method, the optical probe beam was focused at the detection crystal 34 in a line. This line was imaged back on the 2D CCD camera of the spectrometer 38 along the vertical direction i.e. perpendicular to the diffraction plane of the grating in the spectrometer 38. This way the phase change or the OPD measured along vertical direction of the CCD camera gives the spatial profile of the THz signal.

Figure 3:
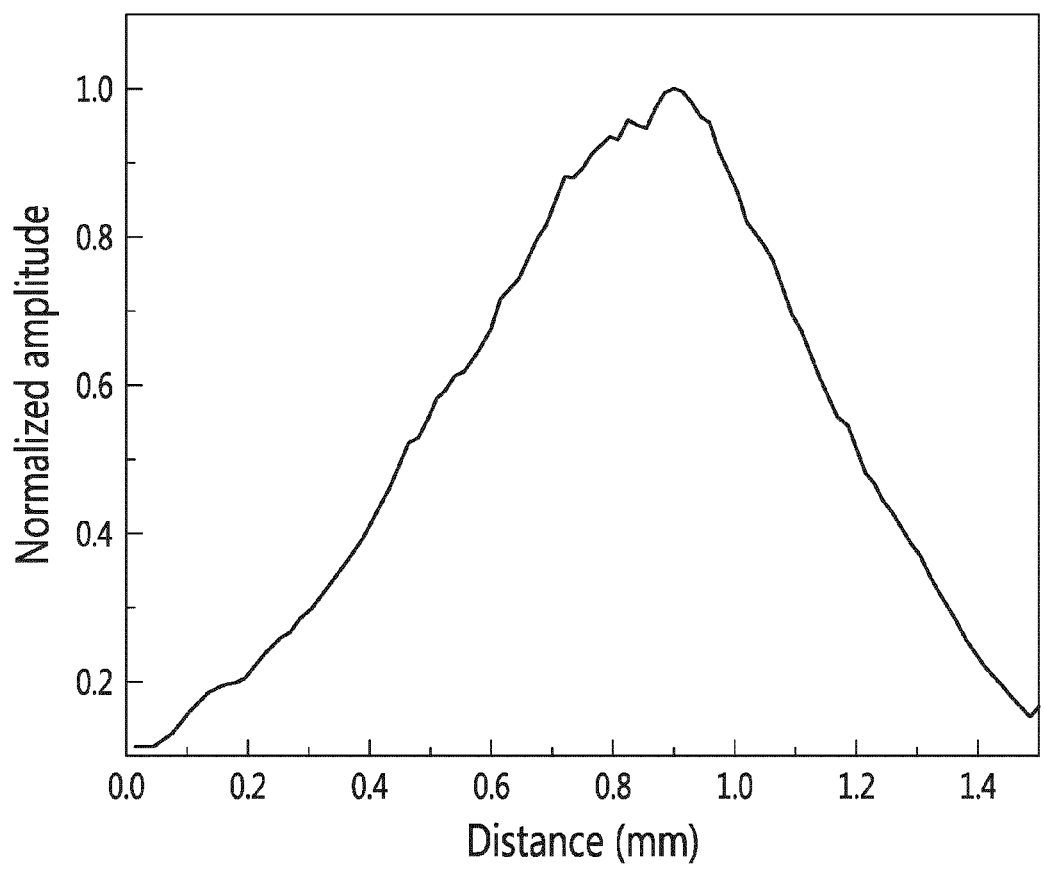
FIG. 3 shows the spatial profile of the THz focal spot at the detector position according to an embodiment of an aspect of the present invention.

The reconstructed spatial profile of the THz beam is shown in FIG. 3. From FIG. 3, the full width at half maximum (FWHM) of the THz focal spot is measured to be 0.8 mm. Knowing the energy and the temporal and the spatial shape of the THz pulse, the THz electric field is evaluated using following relation:

$$E_0 = \sqrt{\frac{\eta_0 W}{\pi \omega_I^2 \int g^2(t) dt}} \quad (4)$$

where $E_0$ is the THz peak electric field, $\eta_0$ is the free-space impedance (377Ω), W is the THz energy, $\omega_I$ is the intensity beam waist, and g(t) is the temporal shape of the THz electric field (with a peak value normalized to 1). The evaluated electric field is about 109 kV/cm.

In the system illustrated herein, the scan length was limited to 3 ps due to the use of a glass plate 28 with thickness 300 μm (3 ps). This time frame can be increased by using a plate 28 of a larger thickness within the depth range of the SDI system. This decreases the signal-to-noise ratio (SNR) associated with the larger OPD between the two interfering signal [13]. However, in order to work around the zero OPD between the interfering signals where the signal-to-noise ratio (SNR) of the SDI is maximum, a Mach-Zehnder interferometer configuration can be used.

The above demonstrates a simple method and system, using spectral domain interferometry (SDI) to measure the change in the phase delay between the probe beam and the reference beam introduced by the EO crystal due to birefringence induced by the THz electric field. They allow to take long THz-TDS scans for increased spectral resolution without facing the limitation of over-rotation in the measurement.

The present method and system allows measuring the THz electric field with good signal-to-noise ratio (SNR), which can further be improved by using a good quality CCD camera. The use of SDI in EO sampling eliminates the need of cross polarizers and thus overcomes the limitation of over-rotation for intense THz electric fields detections. Simple calculation suggest that a phase difference as high as $8898\pi$ at $\lambda_0=790$ nm can be measured, which is approximately 18,000 times higher than the OPD measurable with the electro-optic sampling method ($\pi/2$).

Moreover, the present method and system allow reconstructing the spatial profile of the THz beam profile in a single shot.

The present method and system not only allow measuring the intense THz electric field for spectroscopic purposes with good spectral resolution, but also simplify the required equipment by eliminating complicated components, such as lock-in amplifiers.

The present method and system allow the use of thick detection crystals, by solving the problem of over-rotation for recently developed high power THz sources.

The scope of the claims should not be limited by the embodiments set forth in the examples, but should be given the broadest interpretation consistent with the description as a whole.

REFERENCES

1. D. L. Woolard, W. R. Loerop, and M. S. Shur, *Terahertz Sensing Technology* (World Scientific, New Jersey, 2003).
2. D. Mittleman, *Sensing with Terahertz Radiation* (Springer-Verlag, Berlin, 2003).
3. A. G. Markelz, A. Roitberg, and E. J. Heilweil, "Pulsed terahertz spectroscopy of DNA, bovine serum albumin and collagen between 0.1 and 2.0 THz," Chemical Physics Letters 320, 42-48 (2000).
4. S. Kono, M. Tani, P. Gu, and K. Sakai, "Detection of up to 20 THz with a low-temperature-grown GaAs photoconductive antenna gated with 15 fs light pulses," Applied Physics Letters 77, 4104-4106 (2000).

5. X.-C. Zhang, J. A. Riordan, and F.-G. Sun, "Electro-optical and magneto-optical sensing apparatus and method for characterizing free-space electromagnetic radiation", U.S. patent, ed. (Rensselaer Polytechnic Institute USA, 2000).
6. X. Lu, and X. C. Zhang, "Balanced terahertz wave air-biased-coherent-detection," Applied Physics Letters 98, 151111-151113 (2011).
7. Q. Wu, and X. C. Zhang, "Free-space electro-optic sampling of terahertz beams," Applied Physics Letters 67, 3523-3525 (1995).
8. Z. Jiang, and X. C. Zhang, "Single-shot spatiotemporal terahertz field imaging," Opt. Lett. 23, 1114-1116 (1998).
9. S. P. Jamison, J. Shen, A. M. MacLeod, W. A. Gillespie, and D. A. Jaroszynski, "High-temporal-resolution, single-shot characterization of terahertz pulses," Opt. Lett. 28, 1710-1712 (2003).
10. K. Y. Kim, B. Yellampalle, A. J. Taylor, G. Rodriguez, and J. H. Glownia, "Single-shot terahertz pulse characterization via two-dimensional electro-optic imaging with dual echelons," Opt. Lett. 32, 1968-1970 (2007).
11. Y. Kawada, T. Yasuda, H. Takahashi, and S.-i. Aoshima, "Real-time measurement of temporal waveforms of a terahertz pulse using a probe pulse with a tilted pulse front," Opt. Lett. 33, 180-182 (2008).
12. J. Fletcher, "Distortion and uncertainty in chirped pulse THz," Opt. Express 10, 1425-1430 (2002).
13. T. Bajraszewski, M. Wojtkowski, M. Szkulmowski, A. Szkulmowska, R. Huber and A. Kowalczyk, "Improved spectral optical coherence tomography using optical frequency comb", Opt. Express 16 (6), 4163-4176 (2008).
14. J. Zhang, B. Rao, L. Yu and Z. Chen, "High-dynamic-range quantitaive phase imaging with spectral domain phase microscopy," Opt. Lett. 34, 3442-3444 (2009).

The invention claimed is:

1. A spectral domain interferometry system for characterizing terahertz radiation, comprising:
a terahertz source, generating a terahertz pulse from a pump beam;
a glass plate generating, from a probe beam, two pulses separated by an optical delay longer than the duration of the THz pulse;
an off-axis mirror;
a first and a second cylindrical lenses;
a detector crystal; and
a spectrometer;
wherein the terahertz pulse is focused into the detector crystal by said off-axis mirror, said two pulses propagate through the first cylindrical lens and a hole in said off-axis mirror, are line focused onto the detector crystal at the same position as the terahertz pulse and propagate through said second cylindrical lens to said spectrometer, said spectrometer measuring changes in interference between the two pulses generated by said glass plate due to birefringence induced by the terahertz electric field.

2. The system of claim 1, comprising:
a broadband light source;
a first beam splitter splitting a beam from said a broadband light source into the probe beam and the pump beam;
a second beam splitter splitting the probe beam into a first optical beam and a second optical beams, said glass plate reflecting the first optical beam as a front optical pulse beam and a back optical pulse beam separated by an optical delay;
wherein the front pulse beam and the terahertz pulse are overlapped in space and time in the detector crystal whereas the back pulse beam and the terahertz pulse are overlapped in space in the detector crystal; and the front pulse and the back pulses are sent to the spectrometer where they interfere.

3. The system of claim 1, wherein said terahertz source is a $LiNbO_3$ crystal; said glass plate has a refractive index of 1.5 and a thickness of 0.3 mm, said two pulses being separated by an optical delay of 3 ps; and said detector crystal is a 0.5 mm thick ZnTe crystal.

4. The system of claim 1, wherein said spectrometer comprises a diffraction grating, a cylindrical lens and a CCD camera.

5. The system of claim 1, further comprising an optical delay line used to vary the time between the THz pulse and the probe beam.

6. A method for characterizing terahertz radiation using spectral domain interferometry to measure a change in the phase delay between a probe beam and a reference beam introduced by an electro-optic crystal due to birefringence induced by a terahertz electric field, the method comprising:
splitting an input broadband light beam into a pump pulse and a probe pulse;
passing the pump pulse through a terahertz crystal to generate a terahertz radiation;
passing the probe pulse through a glass plate to generate a front pulse, reflecting from a front surface of the glass plate, and a back pulse, reflecting from a back surface of the glass plate, separated by an optical delay set by a thickness of the glass plate and longer than a duration of the terahertz radiation;
overlapping the front pulse in time and space with the THz radiation and the back pulse in space with the THz radiation in a detector crystal;
sending the front and back pulses to a spectrometer; and
observing interferences between the front and back pulses.

7. A method for characterizing terahertz radiation using spectral domain interferometry to measure a change in the phase delay between a probe beam and a reference beam introduced by an electro-optic crystal due to birefringence induced by a terahertz electric field, the method comprising:
splitting an input broadband light beam into a pump pulse and a probe pulse;
passing the pump pulse through a terahertz crystal to generate a terahertz radiation;
passing the probe pulse through a glass plate to generate a front pulse, reflecting from a front surface of the glass plate, and a back pulse, reflecting from a back surface of the glass plate, separated by an optical delay set by a thickness of the glass plate and longer than a duration of the terahertz radiation;
overlapping the front pulse in time and space with the THz radiation and the back pulse in space with the THz radiation in a detector crystal;
sending the front and back pulses to a spectrometer; and
observing interferences between the front and back pulses;
and further comprising a Fourier transform of the front and back pulses, thereby providing information on a relative phase difference between the front and back pulse.

8. A method for characterizing terahertz radiation using spectral domain interferometry to measure a change in the phase delay between a probe beam and a reference beam introduced by an electro-optic crystal due to birefringence induced by a terahertz electric field, the method comprising:
splitting an input broadband light beam into a pump pulse and a probe pulse;
passing the pump pulse through a terahertz crystal to generate a terahertz radiation;

passing the probe pulse through a glass plate to generate a front pulse, reflecting from a front surface of the glass plate, and a back pulse, reflecting from a back surface of the glass plate, separated by an optical delay set by a thickness of the glass plate and longer than a duration of the terahertz radiation;

overlapping the front pulse in time and space with the THz radiation and the back pulse in space with the THz radiation in a detector crystal;

sending the front and back pulses to a spectrometer; and observing interferences between the front and back pulses;

further comprising a Fourier transform of the front and back pulses, thereby providing information on a relative phase difference between the front and back pulse, and further comprising tracking the relative phase difference between the front and back pulse over time.

\* \* \* \* \*